United States Patent [19]

Wang

[11] Patent Number: 5,517,667

[45] Date of Patent: May 14, 1996

[54] NEURAL NETWORK THAT DOES NOT REQUIRE REPETITIVE TRAINING

[75] Inventor: Shay-Ping T. Wang, Tempe, Ariz.

[73] Assignee: Motorola, Inc., Schaumburg, Ill.

[21] Appl. No.: 76,601

[22] Filed: Jun. 14, 1993

[51] Int. Cl.⁶ .................................................... G06F 15/18
[52] U.S. Cl. ................................ 395/24; 395/21; 395/23
[58] Field of Search ................................. 395/21, 23, 24, 395/22, 27

[56] References Cited

U.S. PATENT DOCUMENTS

| | | | |
|---|---|---|---|
| 3,638,196 | 1/1972 | Nishiyama | 395/24 |
| 3,922,536 | 11/1975 | Hampel et al. | 235/152 |
| 3,967,100 | 6/1976 | Shimomura | 235/152 |
| 4,660,166 | 4/1987 | Hopfield | 395/24 |
| 4,874,963 | 10/1989 | Alspecter | 395/24 |
| 4,912,649 | 3/1990 | Wood | 395/23 |
| 5,046,020 | 9/1991 | Filkin | 364/200 |
| 5,058,180 | 10/1991 | Khan | 364/274.9 |
| 5,073,867 | 12/1991 | Murphy et al. | 395/27 |
| 5,093,792 | 3/1992 | Taki et al. | 395/22 |
| 5,159,660 | 10/1992 | Lu et al. | 395/22 |
| 5,166,539 | 11/1992 | Uchimura et al. | 395/24 |
| 5,220,559 | 6/1993 | Tsuzuki et al. | 395/26 |
| 5,239,594 | 8/1993 | Yoda | 395/24 |
| 5,251,286 | 10/1993 | Wiener et al. | 395/23 |
| 5,263,121 | 11/1993 | Melsa et al. | 395/22 |
| 5,265,192 | 11/1993 | McCormack | 395/22 |
| 5,272,723 | 12/1993 | Kimoto et al. | 364/724.19 |
| 5,293,457 | 3/1994 | Arima et al. | 395/24 |
| 5,333,239 | 7/1994 | Watanabe et al. | 395/23 |
| 5,333,240 | 7/1994 | Matsumoto et al. | 395/11 |

OTHER PUBLICATIONS

Keith C. Drake, "Highly-Automated, Non-Parametric Statistical Learning for Autonomous Target Recognition", Proceedings of the SPIE 20th Applied Imagery Pattern Recognition Workshop—Oct. 1991, McLean, Virginia, pp. 1–10.

Sean B. Holden and Peter J. W. Rayner, "Generalization and Learning in Volterra and Radial Basis Function Networks: A Theoretical Analysis", IEEE International Conference on Acoustics, Speech and Signal Processing, Mar. 23–26, 1992, vol. II, pp. II–273–II–276.

Jack Shandle, "Neural Networks are Ready for Prime Time", Electronic Design, Advanced Technology Series, Feb. 18, 1993, pp. 51–58.

Naohiro Toda, Ken–ichi Funahashi and Shiro Usui, "Polynomial Functions Can Be Realized by Finite Size Multilayer Feedforward Neural Networks", IEEE International Joint Conference on Neural Networks, Nov. 18–21, 1991, Singapore, vol. 1 of 3, pp. 343–348.

Richard P. Lippmann, "An Introduction to Computing with Neural Nets", IEEE ASSP Magazine, Apr. 1987, pp. 4–22.

Peter D. Varhol, "Modeling Systems with Polynomial Networks", Dr. Dobb's Journal, Sep. 1993.

AbTech Corporation, "AIM™ Outperforms Neural Networks and Regression!", Brochure, 1993.

Chang et al., "Polynomial and Standard Higher order Neural Network", IEEE Int. Conf. on Neural Networks, Mar.–Apr. 1993.

Manry et al., "Output Weight Optimization for the Multi--Layer Perceptron", Conf. Record of the Twenty-Sixth Asilomar Conf. on Signals, Systems and Computers, 26–28 Oct. 1992.

(List continued on next page.)

*Primary Examiner*—George B. Davis
*Attorney, Agent, or Firm*—Bruce E. Stuckman; Walter W. Nielsen

[57] ABSTRACT

A neural network, which may be implemented either in hardware or software, is constructed of neurons or neuron circuits each having only one significant processing element in the form of a multiplier. A hidden neuron in the neural network generates an output based on the product of a plurality of functions. The neural network utilizes a training algorithm which does not require repetitive training and which yields a global minimum to each given set of input vectors.

9 Claims, 9 Drawing Sheets

OTHER PUBLICATIONS

Malakooti et al., "An Artificial Neural Networks for Approximating Polynomial functions", IJCNN, Jun. 1992.

Hoffmann et al, "A Neural Feed Forward Network with A Ploynomial Nonlinearity", Proceedings of the IEEE–SP Workshop; 31 Aug–2 Sep. 1992.

Wei et al., "Approximation Property of Multi–Layer Neural Network (MLNN) and its Application in Nonlinear simulation", IJCNN, Jul. 1991.

Roy et al., "A Polynominal Time Algorithm for generating Neural Networks for Classification Problems", IJCNN, 1992.

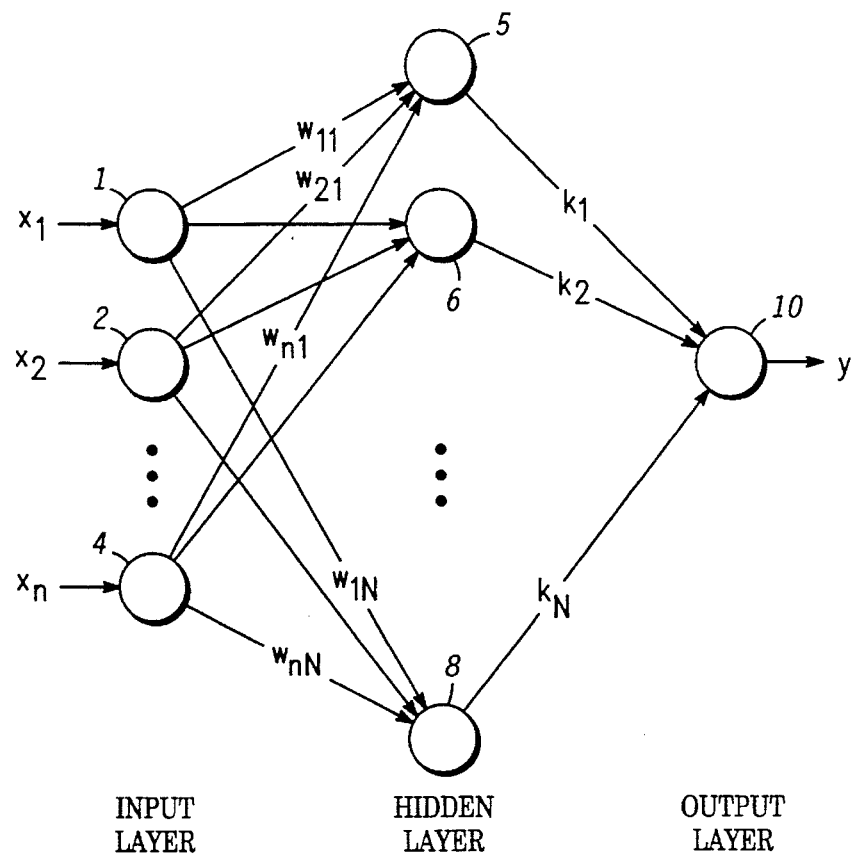
INPUT LAYER    HIDDEN LAYER    OUTPUT LAYER
*FIG. 1*
—PRIOR ART—
*FIG. 2*
—PRIOR ART—
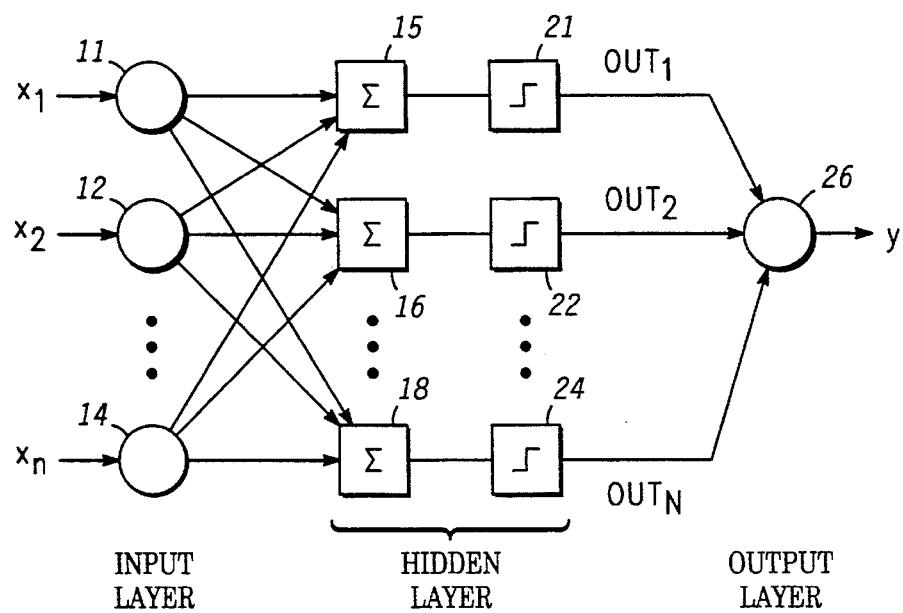
INPUT LAYER    HIDDEN LAYER    OUTPUT LAYER

INPUT LAYER    HIDDEN LAYER    OUTPUT LAYER

INPUT LAYER    HIDDEN LAYER    OUTPUT LAYER

NEURAL NETWORK THAT DOES NOT REQUIRE REPETITIVE TRAINING

RELATED INVENTION

The present invention is related to the following invention which is assigned to the same assignee as the present invention:

"Artificial Neuron and Method of Using Same", having Ser. No. 08/076,602, filed concurrently herewith.

The subject matter of the above-identified related invention is hereby incorporated by reference into the disclosure of this invention.

TECHNICAL FIELD

This invention relates generally to artificial neural networks and, in particular, to a neural network that can be implemented in a VLSI (very large scale integration) chip or in a computer program and which utilizes a training algorithm that does not require repetitive training and that yields a global minimum to each given set of input vectors.

BACKGROUND OF THE INVENTION

Artificial neural networks have utility in a wide variety of computing environments, such as speech recognition, process control, optical character recognition, signal processing, and image processing. Processing engines for many of the foregoing may be implemented through neural networks comprising a plurality of elemental logic elements called neuron circuits.

A neuron circuit (or processing element) is the fundamental building block of a neural network. A neuron circuit has multiple inputs and one output.

As described in the Related Invention identified above, the structure of a conventional neuron circuit often includes a multiplier circuit, a summing circuit, a circuit for performing a non-linear function (such as a binary threshold or sigmoid function), and circuitry functioning as synapses or weighted input connections. Because a typical conventional neuron circuit requires all of the above-described circuitry, the number of neuron circuits which can be manufactured on a semiconductor chip is severely limited.

There are more than twenty known types of neural network architectures, of which the "back-propagation", "perceptron", and "Hopfield network" are the best known.

FIG. 1 shows a prior art back-propagation neural network. As shown in FIG. 1, the back-propagation network typically comprises at least three layers: an "input layer", a "hidden layer", and an "output layer". However, as is well known, many more than three layers may be required to solve medium-sized problems.

With reference to the specific back-propagation neural network shown in FIG. 1, each of a plurality of inputs $x_1$-$x_n$ is coupled to a respective input node in the input layer (of which only input nodes 1, 2, and 4 are shown). For example, input $x_1$ is coupled to input node 1.

The output of each input node 1, 2, and 4 in the input layer is coupled to each neuron circuit of the hidden layer (of which only neuron circuits 5, 6, and 8 are shown). For example, the output of input node 1 is coupled to each of neuron circuits 5, 6, 8, and to all other neuron circuits (not shown) in the hidden layer. The same connections are made regarding the outputs of input nodes 2, 4, and all other input nodes (not shown) in the input layer.

Each neuron circuit in the hidden layer multiplies its inputs, as received from the input nodes, by a given weight to produce a product. For example, neuron circuit 5 multiplies input $x_1$ by weight $w_{11}$, input $x_2$ by weight $w_{21}$, and so on.

Then each neuron circuit sums these products together to produce a "net" which is transformed by a non-linear function to produce its corresponding neuron circuit output.

The operation of the neuron circuit 10 in the output layer is similar to that of the neuron circuits of the hidden layer. The inputs to neuron circuit 10 are the outputs of the hidden layer neuron circuits, and the weights are $k_1, k_2, \ldots, k_N$.

For each cycle (epoch), the back-propagation algorithm first adjusts the weights $k_1$, $k_2$, and $k_N$ of the output layer. Then it adjusts the weights $w_{11}, w_{21}, \ldots, w_{nN}$ of the hidden layer in a backward manner.

The back-propagation algorithm suffers several serious drawbacks. First, it is time-consuming to train the network for a relatively complex problem. For instance, it may take weeks, or even months, of computational time, often using a super-computer, to train a network. In a known example involving speech-recognition, it required several weeks, using a four-processor minicomputer, to train a back-propagation neural network in order to simply recognize the voiced and unvoiced stops (i.e. the consonants B,D,G,P,T, and K).

Secondly, when weights converge, they usually converge to local minima, which gives an erroneous solution. To avoid local minima, statistical methods such as Boltzman training or Cauchy training may be applied. These methods first randomly vary the weights of neuron circuits and then evaluate the error between desired and actual outputs. In most cases the weights that minimize the errors should be retained. However, in some cases, weights that do not minimize the errors are also kept if required by a given probability.

Although a statistical method can achieve a global minimum, it is extremely inefficient. For example, its convergence rate is reported to be 100 times slower than that of the back-propagation algorithm.

FIG. 2 shows a prior art perceptron neural network. Each of a plurality of inputs $x_1, x_2, \ldots, x_n$ is coupled to a respective input node 11, 12, ..., 14 in the input layer. The output of each input node 11, 12, ..., 14 is distributed to each of a plurality of neuron circuits in the hidden layer, which neuron circuits include summing circuits 15, 16, ..., 18 and circuits 21, 22, ..., 24 for performing a non-linear function. For example, the output of input node 11 is distributed to each of summing circuits 15, 16, ..., 18.

The output of each summing circuit 15, 16, ..., 18 is fed into a respective binary threshold circuit 21, 22, ..., 24. The output of binary threshold circuit 21 is $OUT_1$; the output of binary threshold circuit 22 is $OUT_2$; and so forth.

The outputs $OUT_1, \ldots, OUT_N$ are fed into an output neuron circuit 26. Output neuron circuit 26 comprises a summing circuit (not shown), which may be like summing circuit 15, and a non-linear function (not shown), which may be like binary threshold circuit 21.

Developed in the 1950's, the perceptron neural network utilizes "delta rule" training algorithm to compute the weights of the neurons. The delta rule uses the difference between the desired output and the actual output to compute the neuron weights.

Because a single-layer perceptron network is incapable of solving a non-linear problem, its utility is rather limited.

FIG. 3 shows a prior art Hopfield neural network. Each of a plurality of inputs $x_1$-$x_n$ is coupled to a respective neuron circuit appearing in what is identified in FIG. 3 as the "hidden layer". Each neuron circuit includes a summing circuit 35, 36, . . . , 38, and the output of each summing circuit 35, 36, . . . , 38 is input to a respective binary threshold circuit 41, 42, . . . , 44. The output $y_1, y_2, \ldots, y_n$ of each binary threshold circuit 41, 42, . . . , 44 is fed back to the input of a respective input node 31, 32, . . . , 34 in what is identified in FIG. 3 as the "input layer".

In all other respects the operation of the Hopfield network is identical to that of the back-propagation neural network. The Hopfield network is characterized as a "recurrent" network, because its output signals are fed back to its input layer. A recurrent network must be concerned with a stability problem. Generally, it is found that by avoiding feeding-back the output signal to the neuron circuit itself, the network can be stabilized.

The Hopfield network is especially effective in solving so-called "non-deterministic polynomial" problems, such as printed circuit board routing or the familiar traveling-salesman problem. However, the Hopfield network gives only the local minimum solution. Moreover, it is not a trivial task to find a specific energy function (e.g. Liapunov energy function) required by a Hopfield network for a given problem.

With respect to neural networks in general, a network's training algorithm is usually dictated by the structure of the neural network. With a conventional neural network architecture, it is very difficult to train the network, and such training is usually very repetitive. For example, an Exclusive-Or logic implementation often requires more than thirty iterations if a back-propagation algorithm is used.

Also the training algorithm often converges to a local minimum, which is not the optimum solution. The optimum solution would be a "best fit" or "global minimum" for a given set of examples.

In addition to the problems of inefficient, slow, and ineffective training algorithms discussed above, the existing known neural networks present substantial difficulties to prospective users in defining a proper architecture for solving a given problem, because the manner of determining the number of layers, the number of neuron circuits per layer, and the interconnections between neuron circuits is usually done by trial-and-error or rule-of-thumb.

For instance, there is no clear way for determining how many hidden units (layers or neuron circuits) are required to tackle a problem. One way of determining this is to increase the number of hidden units gradually and to observe the network performance. This practice is continued until no more significant performance improvement is found. Needless to say, this is an extremely time-consuming process.

In summary, the drawbacks of existing known neural networks (e.g. deficiencies associated with training algorithms, ill-defined architecture, local minima solutions, etc.) severely limit the acceptance and proliferation of neural networks in many potential areas of utility, namely, manufacturing (statistical process control, routing), process control (adaptive control), CAD/CAM (optimization), robotics (coordinate transformation, adaptive control), imaging processing (smoothing, feature extraction), signal processing (noise cancellation, echo suppression), and so forth.

In addition, the complex circuitry of known neural networks severely limits their implementation in the form of semiconductor chips or computer software.

Thus there is a significant need for a neural network which does not require repetitive training, which yields a global minimum to each given set of input vectors, and which has a straight-forward architecture that is easy and inexpensive to implement.

SUMMARY OF INVENTION

A preferred embodiment of a neural network designed in accordance with the teachings of the present invention comprises at most three layers. A first layer serves an interconnect function, connecting external inputs to the network. A second layer utilizes the neuron circuit described in the above-identified Related Invention or its software equivalent. A third layer is the output layer, which collectively sums up the outputs of the neuron circuits in the second layer.

In contrast to conventional neural networks which require lengthy training cycles, a neural network constructed in accordance with the present invention converges on a global solution in a single training cycle (also referred to as an epoch or iteration) which can often be computed in no more than a few minutes on a personal computer.

Moreover, in contrast to conventional neural networks, there is provided in accordance with the present invention a neural network which utilizes a plurality of neuron circuits which do not individually utilize any non-linear function or summing circuit and which each require only a multiplier circuit as its main processing element. Therefore, many more neuron circuits can be integrated in a VLSI chip, which greatly increases the computational power of a neural network using one or more of such chips.

Thus it will be appreciated that a neural network constructed in accordance with the present invention performs with vastly more accurate results, at a vastly improved reduction in computational time, and with a vast reduction in the cost and complexity of its implementation, whether on a semiconductor chip or in a computer program.

In addition, a neural network constructed in accordance with the present invention can have multiple outputs by providing multiple summing circuits for summing the outputs of the neuron circuits (note that the individual neuron circuits do not each require summing circuits).

Thus it is an advantage of the present invention to provide a neural network which utilizes a plurality of neuron circuits which each require essentially only a multiplier circuit as its main processing element, so that a neural network may be built comprising a very large number of such neuron circuits, resulting in a product which is commercially competitive due to its high level of functionality and low cost of manufacture.

It is also an advantage of the present invention to provide a neural network which does not require repetitive training.

Yet another advantage of the present invention is to provide a neural network which yields a global minimum to each given set of input vectors.

It is another advantage of the present invention to provide a method of training a neural network which does not require repetitive training.

It is also an advantage of the present invention to provide a method of using a neural network in accordance with the present invention.

According to one aspect of the invention, there is provided a neural network having a plurality of network inputs and at least one network output, the neural network comprising: a plurality of neurons, each neuron having a plurality of inputs responsive to corresponding ones of the plurality of network inputs and generating an output; and means for summing the outputs of the neurons and generating the at least one network output.

According to another aspect of the invention, there is provided a method for training a neural network comprising a plurality of neurons, which method requires the calculation of weight values and which method does not require repetitive training, the method comprising the following steps: providing a plurality of training examples; comparing the number of training examples with the number of neurons in the neural network; providing at least two techniques for calculating said weight values, wherein if the number of neurons is equal to the number of training examples, using a matrix-inversion technique to solve for the value of each weight; if the number of neurons is not equal to the number of training examples, using a least-squares estimation technique to solve for the value of each weight.

According to yet another aspect of the invention there is provided in a neural network comprising: a plurality of network inputs and at least one network output; a plurality of neurons, each neuron receiving a plurality of inputs and generating an output; a method of operating the neural network, the method comprising the following steps: distributing each of the network inputs to each of the neuron inputs; each neuron applying a gating function to each of the network inputs to produce corresponding gated inputs; each neuron multiplying each of the gated inputs together to generate a product; each neuron multiplying the product by a weight value to generate a neuron output for each neuron; and summing the outputs of the neurons to generate the at least one network output.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 1 shows a prior art back-propagation neural network.

FIG. 2 shows a prior art perceptron neural network.

DETAILED DESCRIPTION OF A PREFERRED EMBODIMENT

It will be understood by one of ordinary skill in the art that the neural network of the present invention may be implemented in hardware, software, or a combination thereof, and that such terms as "neuron circuit" and "neuron" are used interchangeably in this description, as are the terms "multiplier circuit"/"multiplier", "summing circuit"/"summer", etc., depending upon the type of implementation.

Figure 3:
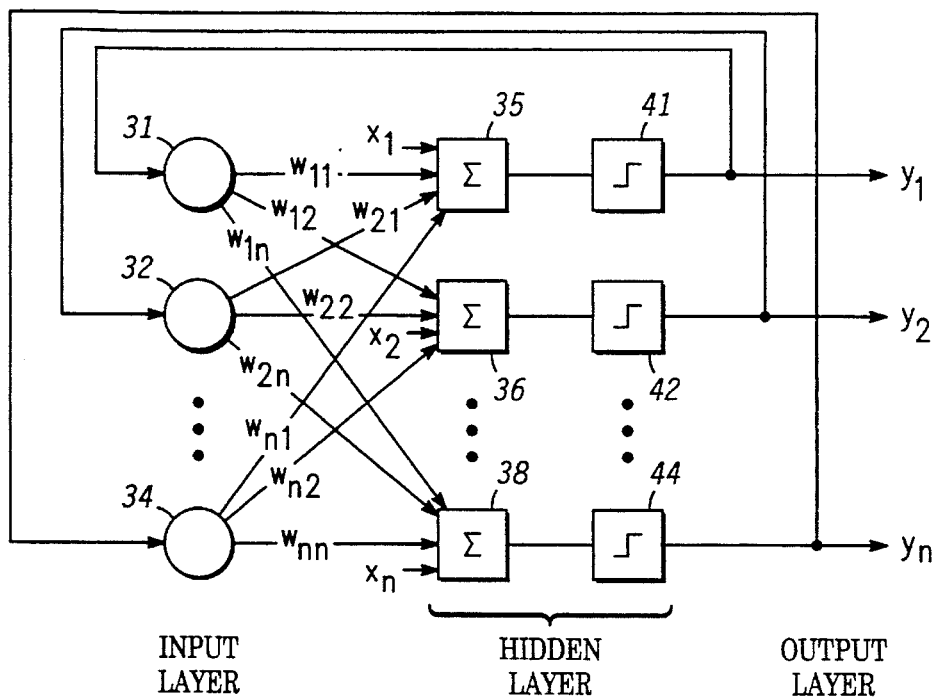
FIG. 3 shows a prior art Hopfield neural network.
Figure 4:
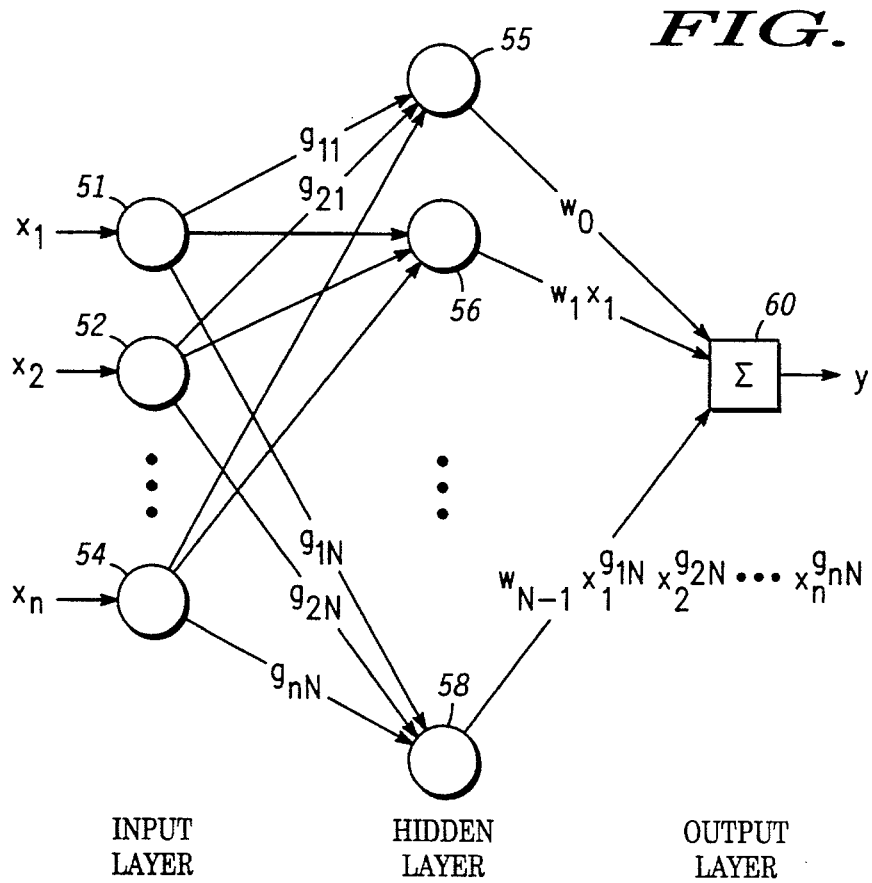
FIG. 4 shows a conceptual diagram of a neural network in accordance wit the present invention.

FIG. 4 shows a conceptual diagram of a neural network in accordance with the present invention. Successive ones of a plurality of network inputs $x_1, x_2, \ldots, x_n$ are fed to input nodes $51, 52, \ldots, 54$ of the input layer.

The output of each input node $51, 52, \ldots, 54$ in the input layer is distributed to each neuron of the hidden layer (of which only neurons 55, 56, and 58 are shown). For example, the output of input node 51 is coupled to each of neurons 55, 56, and 58 and to all other neurons (not shown) in the hidden layer. The same connections are made regarding the outputs of input nodes 52, 54, and all other input nodes (not shown) in the input layer. In the present invention only one layer of neurons is required in the hidden layer.

As described in the above-identified Related Invention, each neuron applies a gating function to each of the network inputs to produce corresponding gated inputs. Any given neuron may apply a different gating function to each different network input it receives. For example, neuron 55 applies a gating function $g_{11}$ to the network input it receives from input node 51; it applies a gating function $g_{21}$ to the network input it receives from input node 52; and so forth. The gated inputs are multiplied together by the multiplier of the neuron to form a product, which is then multiplied by a predetermined weight value to produce the neuron output. For example, in FIG. 4 neuron 55, which happens to be responsible for generating the $w_0$ term of Equation 1 shown below, multiplies its gated inputs together to form a product (which happens to be 1 because in this case the gating functions $g_{11}, g_{21}, \ldots, g_{n1}$ are all 0), which is multiplied by a weight $w_0$ to produce a corresponding output $w_0$. Neuron 56 which happens to be responsible for generating the $w_1 x_1$ term of Equation 1 shown below, multiplies its gated inputs together to form a product (which happens to be $x_1$ because in this case the gating functions are all 0 except the gating function that is applied to the $x_1$ output of input node 51), which is multiplied by a weight $w_1$ to produce a corresponding output $x_1 w_1$. In like fashion, neuron 58 produces an output $$w_{N-1} x_1 g_{1N} x_2 g_{2N} \cdots x_n g_{nN}$$

The outputs of neurons $55, 56, \ldots, 58$ are summed together by a suitable summing means or function, such as summer 60, in the output layer to produce the output y of the neural network.

Figure 5:
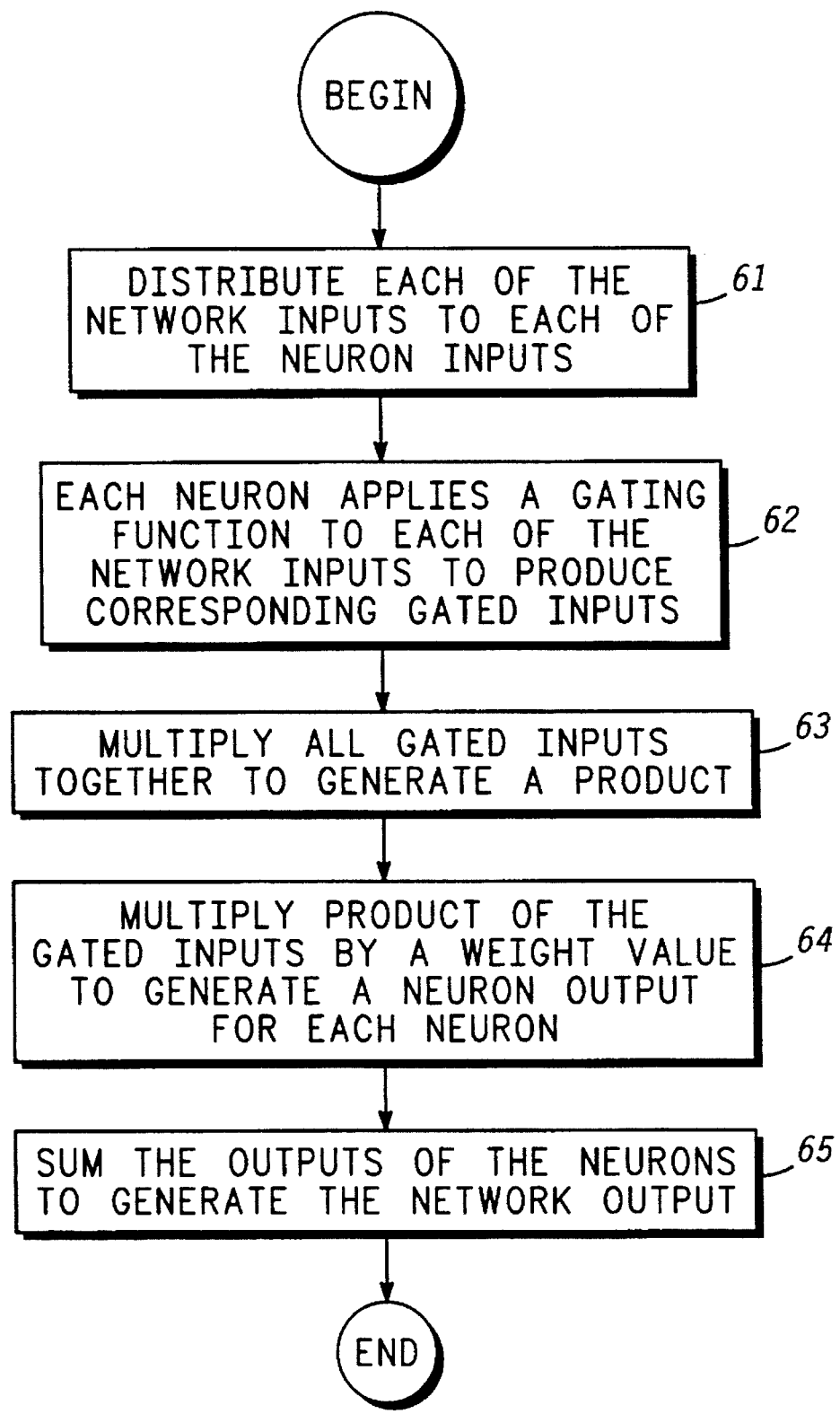
FIG. 5 shows a flow diagram of a method of using the neural network illustrated in FIG. 4.

FIG. 5 shows a flow diagram of a method of using a neural network illustrated in FIG. 4. As illustrated in box 61, each of the network inputs (i.e., inputs $x_1, x_2, \ldots x_n$) are distributed to the inputs of each neuron (i.e. neurons 55, 56, ..., 58 of the hidden layer in FIG. 4).

Next, as illustrated in box 62, each neuron applies a gating function to each of the network inputs to produce corresponding gated inputs. As mentioned above, any given neuron may apply a different gating function to each different network input it receives. For example, with reference to FIG. 4, neuron 55 applies gating function $g_{11}$ to network input $x_1$ it receives from input node 51; it applies gating function $g_{21}$ to network input $x_2$ it receives from input node 52; and so forth.

Next, as illustrated in box 63, the gated inputs for any given neuron are multiplied together to generate a product.

Next, as illustrated in box 64, the product of the gated inputs for any given neuron is multiplied by a predetermined weight value to generate a neuron output for such neuron. Any given neuron may apply a different weight value to its product. This is shown in greater detail regarding FIG. 10 to be described later.

Finally, regarding box 65, the outputs of the neurons are summed to generate the network output.

Figure 6:
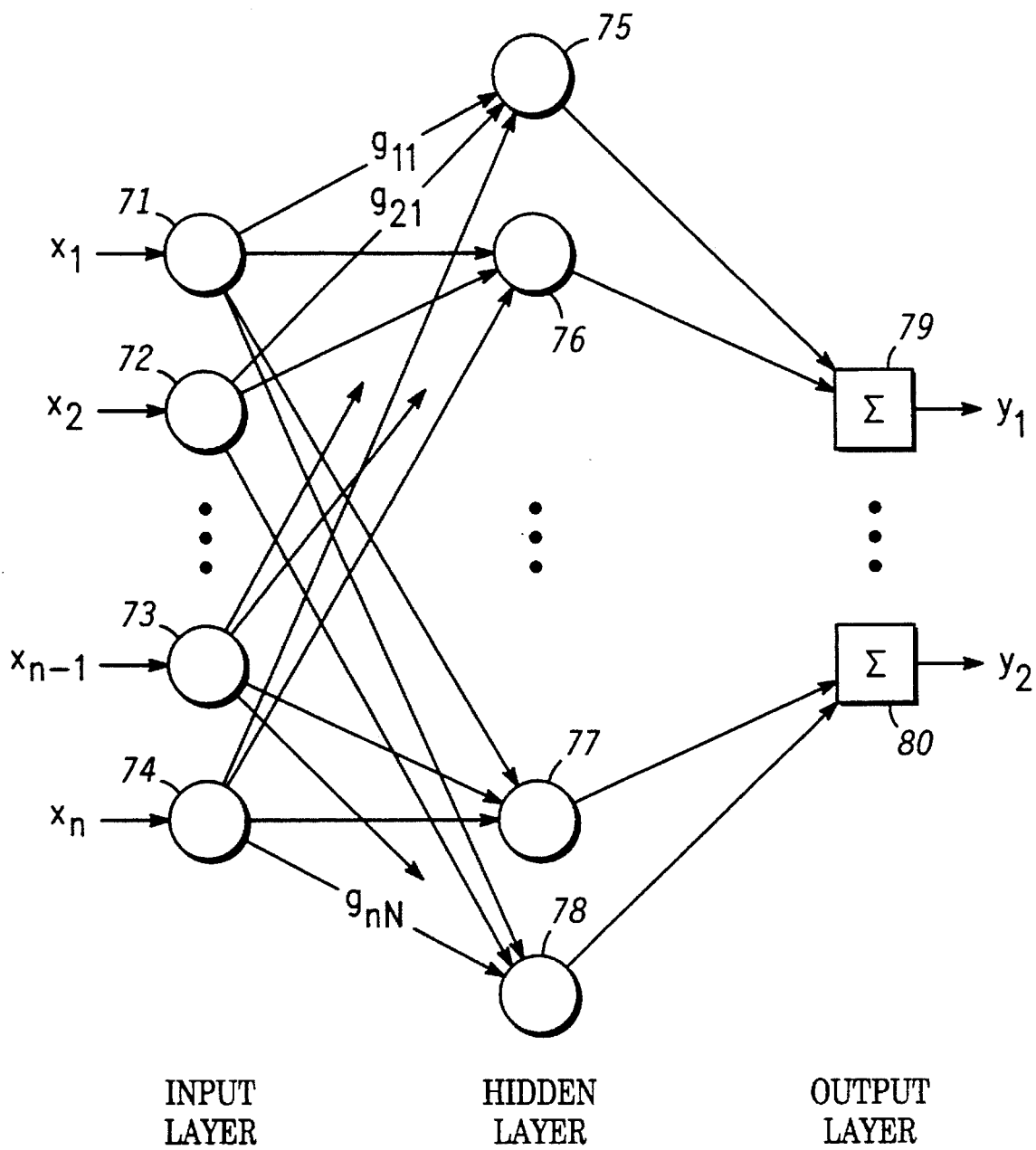
FIG. 6 shows a conceptual diagram of a neural network having a plurality of outputs in accordance with the present invention.

FIG. 6 shows a conceptual diagram of a neural network having a plurality of outputs in accordance with the present invention. A plurality of network inputs $x_1, x_2, \ldots, x_{n-1}$, and $x_n$ are fed to input nodes 71, 72, ..., 73, and 74 of the input layer.

The output of each input node 71, 72, ..., 73, and 74 in the input layer is distributed to each neuron circuit of the hidden layer (of which only neuron circuits 75, 76, 77, and 78 are shown). For example, the output of input node 71 is distributed to each of neuron circuits 75, 76, 77, 78, and to all other neuron circuits (not shown) in the hidden layer. The same connections are made regarding the outputs of input nodes 72, 73, 74, and all other input nodes (not shown) in the input layer.

For this embodiment of the neural network the outputs of neuron circuits 75 and 76 are summed by summing circuit 79 to produce a first network output $y_1$, and the outputs of neuron circuits 77 and 78 are summed by summing circuit 80 to produce a second network output $y_2$.

While FIG. 6 shows two summing circuits in the output layer, it will be understood by one of ordinary skill that more than two summing circuits may be used. Also, although FIG. 6 shows that the network outputs are decoupled, it will be understood that the outputs of the neuron circuits could be distributed to more than one of the summing circuits—e.g. the output of neuron circuit 76 could be distributed to both summing circuits 79 and 80.

Figure 7:
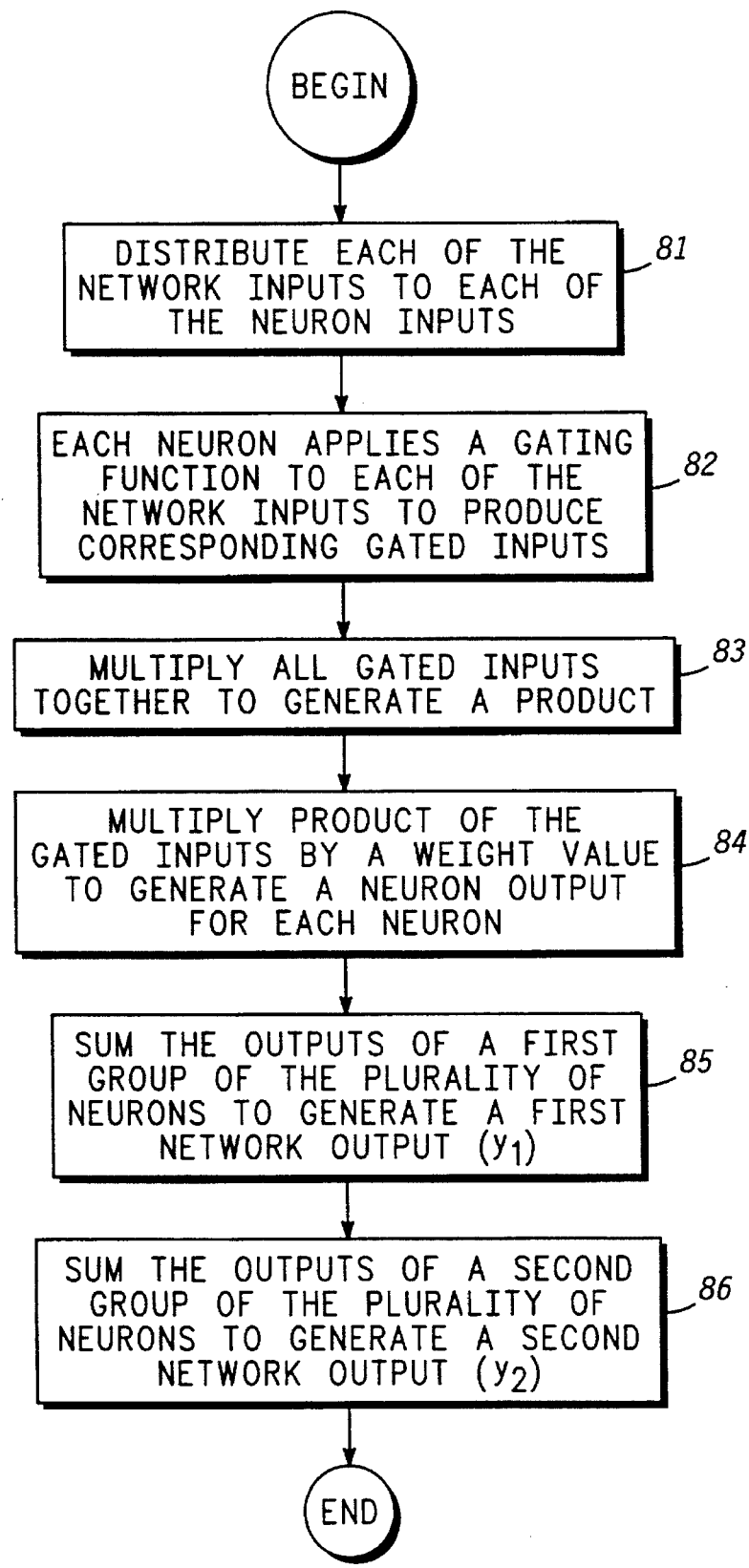
FIG. 7 shows a flow diagram of a method of using the neural network illustrated in FIG. 6.

FIG. 7 shows a flow diagram of a method of using the neural network illustrated in FIG. 6. As illustrated in box 81, each of the network inputs (i.e. inputs $x_1, x_2, \ldots, x_{n-1}, x_n$) is distributed to the inputs of each neuron (i.e. neurons 75, 76, ..., 77, 78 of the hidden layer in FIG. 6).

Next, as illustrated in box 82, each neuron applies a gating function to each of the network inputs to produce corresponding gated inputs. As mentioned above regarding FIG. 5, any given neuron may apply a different gating function to each different network input it receives.

Next, as illustrated in box 83, the gated inputs for any given neuron are multiplied together to generate a product.

Next, as illustrated in box 84, the product of the gated inputs for any given neuron is multiplied by a predetermined weight value to generate a neuron output for such neuron. Also, as mentioned above regarding FIG. 5, any given neuron may apply a different weight value to its product.

Next, regarding box 85, the outputs of a first group of neurons are summed to generate a first network output $y_1$.

Finally, regarding box 86, the outputs of a second group of neurons are summed to generate a second network output $y_2$.

Figure 8:
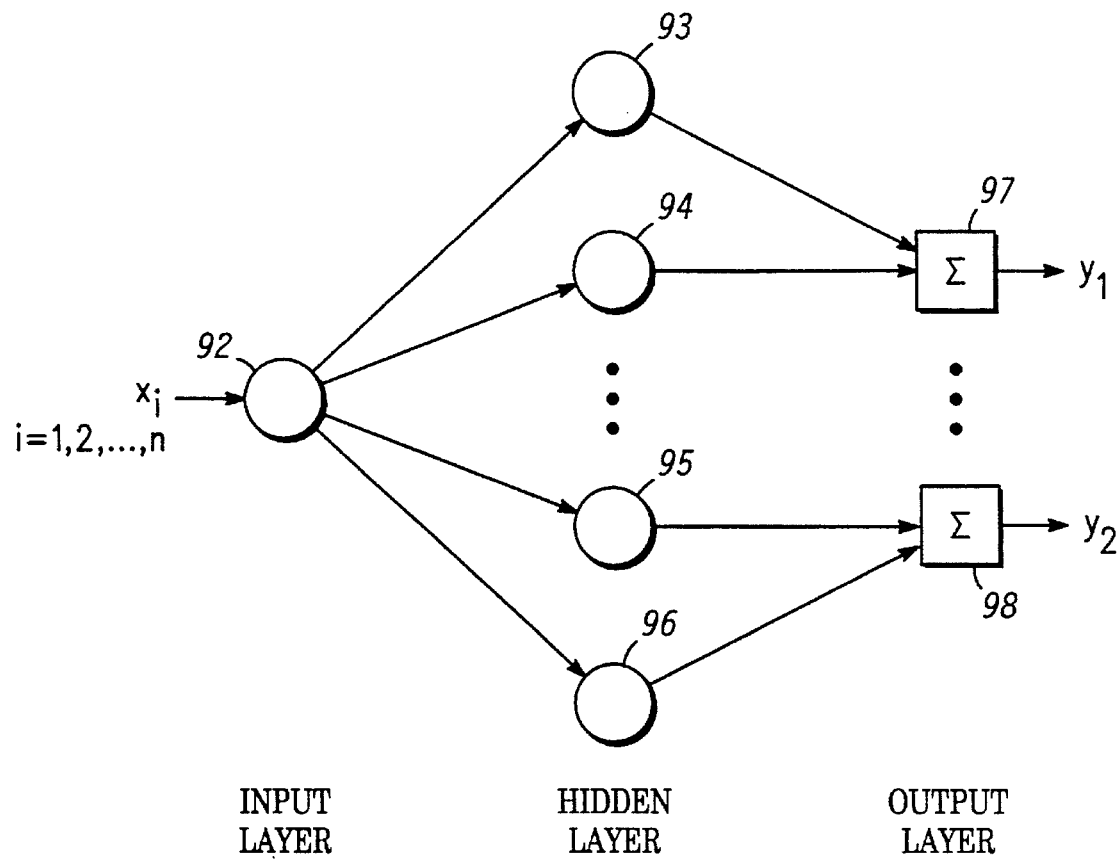
FIG. 8 shows a conceptual diagram of a neural network whose inputs are received sequentially and which has a plurality of outputs, in accordance with a preferred embodiment of the present invention.

FIG. 8 shows a conceptual diagram of a neural network whose inputs are received sequentially and which has a plurality of outputs, in accordance with a preferred embodiment of the invention. A plurality of network inputs $x_1, x_2, \ldots, x_n$ are sequentially fed to a single input node 92 of the input layer. The output of input node 92 is distributed to each neuron of the hidden layer (of which only neurons 93–96 are shown).

For this embodiment of the neural network the outputs of neurons 93 and 94 are summed by summing circuit 97 to produce a first network output $y_1$, and the outputs of neurons 95 and 96 are summed by summing circuit 98 to produce a second network output $y_2$. It will be understood that the outputs of additional neurons (not shown) in the hidden layer may be summed by additional summing circuits (not shown) to produce additional network outputs.

In operation, $x_1$ is first distributed via input node 92 to all neurons 93–96, and the neurons begin processing $x_1$ (as described in the above-identified Related Invention) in parallel. Then, while holding the result from the just-described operation, $x_2$ is then distributed via input node 92 to all neurons 93–96, and the neurons process $x_2$ in parallel.

This operation continues until the last input $x_n$ is processed by the neurons, at which time the outputs of the neurons are fed to their respective summing circuits 97 and 98. It will be appreciated that certain neuron outputs may be summed up in advance of others.

Figure 9:
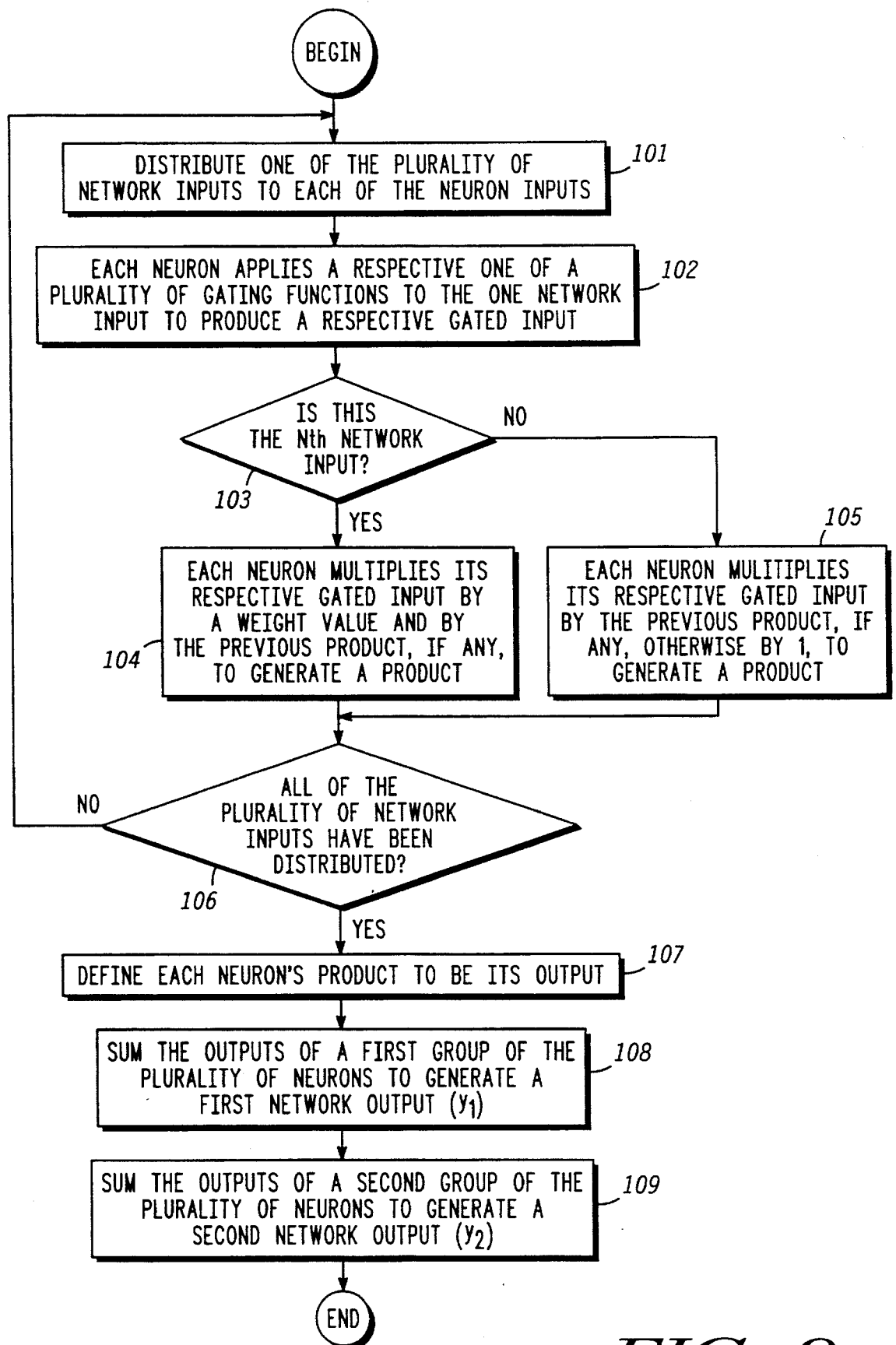
FIG. 9 shows a flow diagram of a method of using the neural network illustrated in FIG. 8.

FIG. 9 shows a flow diagram of a method of using the neural network illustrated in FIG. 8. As illustrated in box 101, a first of a plurality of network inputs (e.g. $x_1$) is distributed to the inputs of each of the neurons, e.g. by input node 92 (FIG. 8).

Next, as illustrated in box 102, each neuron applies one of a plurality of gating functions to the first network input to produce a respective first gated input for each neuron. As mentioned earlier, any given neuron may apply a different gating function to the network input.

Next, as illustrated in decision box 103, a check is made to see whether the network input currently being processed is the Nth network input (i.e. $x_1$ if N=1; $x_2$ if N=2; etc.). N represents the network input corresponding to the gated input which is preselected to be multiplied by the neuron's weight value. N is a positive integer that is less than or equal to the number of network inputs. Thus, depending upon the value of N, each neuron will multiply its respective weight value by the Nth gated input (corresponding to the Nth network input).

In a preferred embodiment, N is chosen to be 1, so that each neuron multiplies the weight value by its first gated input, rather than waiting until all its gated inputs have been multiplied together. This achieves better efficiency, because a subsequent weight value can be loaded in preparation for the next processing operation (i.e. for the next set of $x_n$ network inputs), while the current operation is being completed.

If the network input currently being processed is not the Nth network input, the procedure proceeds to box 105, but if so it proceeds to box 104.

As illustrated in box 104, each neuron multiplies its respective gated input by a weight value and by the previous product, if any (i.e. resulting from processing any network inputs prior to the Nth network input), to generate a product. Upon exiting box 104, the procedure proceeds to box 106.

If the network input currently being processed is not the Nth network input, the procedure proceeds to box 105, but if so it proceeds to box 104.

As illustrated in box 105, each neuron multiplies its respective gated input by the previous product, if any, otherwise by 1, to generate a product. Upon exiting box 105, the procedure proceeds to box 106.

Next, as illustrated in decision box 106, a check is made to determine whether all network inputs have yet been received. If so, the procedure continues with box 107. If not, the procedure returns to box 101, wherein the next of the plurality of network inputs is distributed to the inputs of each of the neurons, and the procedure continues in similar fashion as described above regarding the first network input. After the procedure has dealt with all network inputs, it exits decision box 106 into box 107.

In box 107 each neuron's current product is defined to be the neuron's output.

Next in box 108 the outputs of a first group of neurons are summed to generate a first network output $y_1$. Finally, in box 109 the outputs of a second group of neurons are summed to generate a second network output $y_2$.

Figure 10:
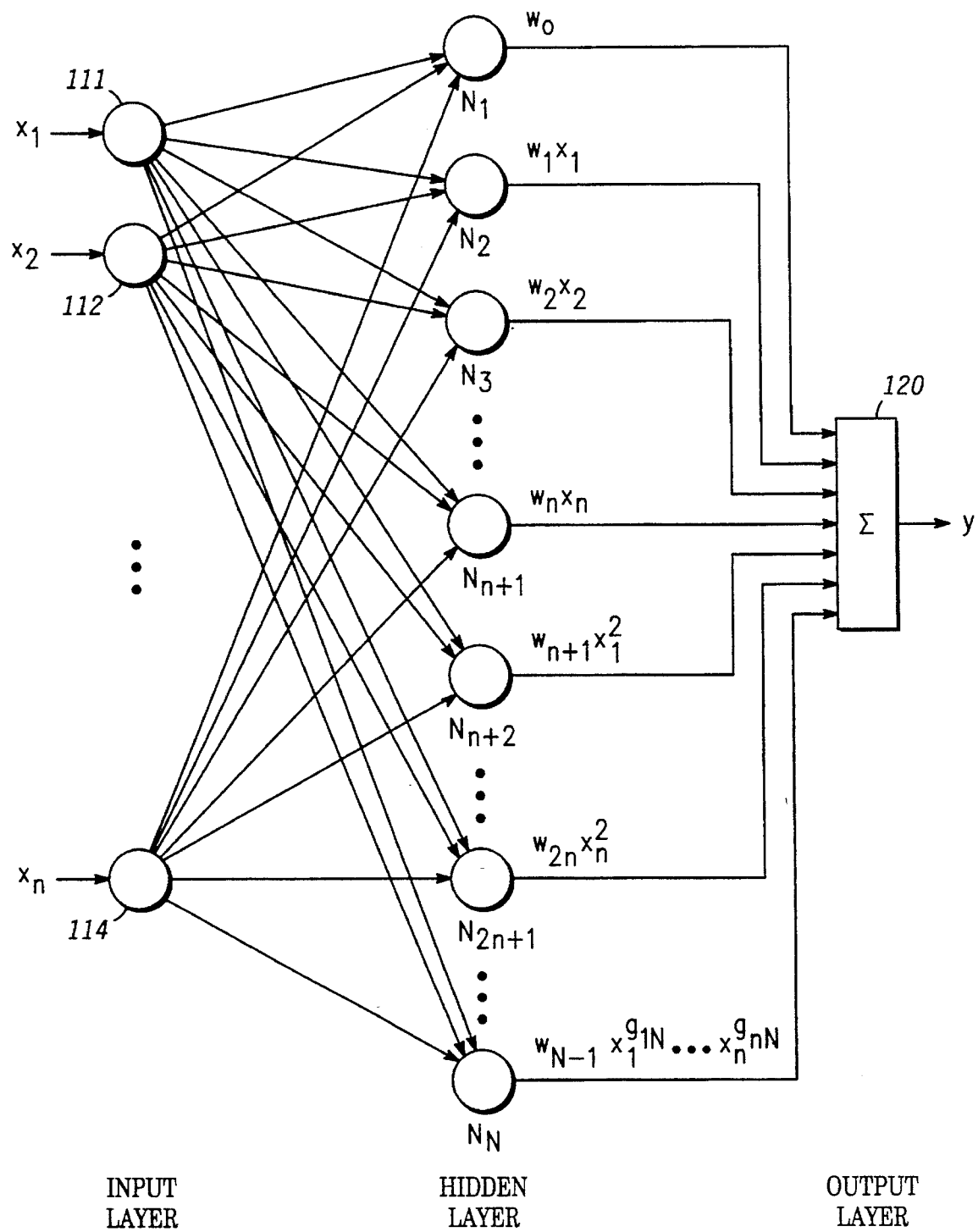
FIG. 10 shows how the neural network shown in FIG. 4 may be applied to a specific example, in accordance with the present invention.

FIG. 10 shows how the neural network shown in FIG. 4 may be applied to a specific example, in accordance with the present invention.

The operation of the neural network of the present invention is based upon the use of a polynomial expansion and, in a loose sense, the use of an orthogonal function, such as sine, cosine, exponential/logarithmic, Fourier transformation, Legendre polynomial, non-linear basis function such as a Volterra function or a radial basis function, or the like, or a combination of polynomial expansion and orthogonal functions.

A preferred embodiment employs a polynomial expansion of which the general case is represented by Equation 1 as follows:

$$y = \sum_{i=1}^{\infty} w_{i-1} x_1^{g_{1i}} x_2^{g_{2i}} \ldots x_n^{g_{ni}} \qquad \text{Equation 1}$$

wherein $x_i$ represent the network inputs and can be a function such as $x_i = f_i(z_j)$, wherein $z_j$ is any arbitrary variable, and wherein the indices i and j may be any positive integers; wherein y represents the output of the neural network; wherein $w_{i-1}$ represent the weight for the ith neuron; wherein $g_{1i}, \ldots, g_{ni}$ represent gating functions for the ith neuron and are integers, being 0 or greater in a preferred embodiment; and n is the number of network inputs.

Each term of Equation 1 expresses a neuron output and the weight and gating functions associated with such neuron. The number of terms of the polynomial expansion to be used in a neural network is based upon a number of factors, including the number of available neurons, the number of training examples, etc. It should be understood that the higher order terms of the polynomial expansion usually have less significance than the lower order terms. Therefore, in a preferred embodiment, the lower order terms are chosen whenever possible, based upon the various factors mentioned above. Also, because the unit of measurement associated with the various inputs may vary, the inputs may need to be normalized before they are used.

Equation 2 is an alternative representation of Equation 1, showing terms up to the third order terms.

$$y = w_0 + \sum_{i=1}^{n} w_i x_i + \sum_{i=1}^{n} w_{f1(i)} x_i^2 + \qquad \text{Equation 2}$$
$$\sum_{i=1}^{n} \sum_{j=i+1}^{n} w_{f2(i,j)} x_i x_j + \sum_{i=1}^{n} w_{f3(i)} x_i^3 +$$
$$\sum_{i=1}^{n} \sum_{j=i+1}^{n} w_{f4(i,j)} x_i^2 x_j + \sum_{i=1}^{n} \sum_{j=i+1}^{n} w_{f5(i,j)} x_i x_j^2 +$$
$$\sum_{i=1}^{n} \sum_{j=i+1}^{n} \sum_{k=i+j+1}^{n} w_{f6(i,j,k)} x_i x_j x_k + \ldots$$

wherein the variables have the same meaning as in Equation 1 and wherein $f_{1(i)}$ is an index function in the range of n+1 to 2n; $f_{2(i,j)}$ is an index function in the range of 2n+1 to 2n+(n)(n−1)/2; and $f_{3(i,j)}$ is in the range of 2n+1+(n)(n−1)/2 to 3n+(n)(n−1)/2. And $f_4$ through $f_6$ are represented in a similar fashion.

Those skilled in the art will recognize that the gating functions are embedded in the terms expressed by Equation 2. For example, Equation 2 can be represented as follows:

$$y = w_0 + w_1 + x_1 + w_2 x_2 + \ldots w_i x_i + \ldots + w_n x_n + \qquad \text{Equation 3}$$
$$w_{n+1} x_1^2 + \ldots + w_{2n} x_n^2 + w_{2n+1} x_1 x_2 +$$
$$w_{2n+2} x_1 x_3 + \ldots + w_{3n-1} x_1 x_n + w_{3n} x_2 x_3 +$$
$$w_{3n+1} x_2 x_4 + \ldots w_{2n+(n)(n-1)/2} x_{n-1} x_n + \ldots +$$
$$w_{N-1} x_1^{g_{1N}} x_2^{g_{2N}} \ldots x_n^{g_{nN}} + \ldots$$

wherein the variables have the same meaning as in Equation 1.

It should be noted that although the gating function terms $g_{in}$ explicitly appear only in the last shown term of Equation 3, it will be understood that each of the other terms has its $g_{in}$ term explicitly shown (e.g. for the $w_1 x_1$ term $g_{12}=1$ and the other $g_{i2}=0$, i=2, 3, . . . , n). N is any positive integer and represents the Nth neuron in the network.

Each term of Equations 1–3 is produced by the output of a neuron or neuron circuit. With regard to FIG. 10, for example, neuron circuit $N_1$ produces the term $w_0$. Neuron circuit $N_2$ produces the term $w_1 x_1$. And so on.

Still referring to FIG. 10, a plurality of network inputs $x_1$, $x_2, \ldots, x_n$ are fed to input nodes 111, 112, . . . , 114 of the input layer. The output of each input node 111, 112, . . . , and 114 in the input layer is distributed to each neuron circuit of the hidden layer (of which only neuron circuits $N_1$, $N_2$, $N_3$, $N_{n+1}$, $N_{n+2}$, $N_{2n+1}$, and $N_N$ are shown). For example, the output of input node 111 is distributed to each of neuron circuits $N_1$, $N_2$, $N_3$, $N_{n+1}$, $N_{n+2}$, $N_{2n+1}$, and $N_N$, and to all other neuron circuits (not shown) in the hidden layer. The same connections are made regarding the outputs of input nodes 112, 114, and all other input nodes (not shown) in the input layer.

For this embodiment of the neural network the outputs of neuron circuits $N_1$, $N_2$, $N_3$, $N_{n+1}$, $N_{n+2}$, $N_{2n+1}$, and $N_N$ are summed by summing circuit 120 to produce a network output y.

While FIG. 10 shows only one summing circuit in the output layer, it will be understood by one of ordinary skill that two or more summing circuits may be used if a particular application requires multiple outputs.

Training Algorithm

For the neural network to be useful, the weights of each neuron circuit must be determined. This can be accomplished by the use of an appropriate training algorithm.

In implementing a neural network of the present invention, one generally selects the number of neurons or neuron circuits to be equal to or less than the number of training examples presented to the network. A training example is defined as one set of given inputs and resulting output(s).

Figure 11:
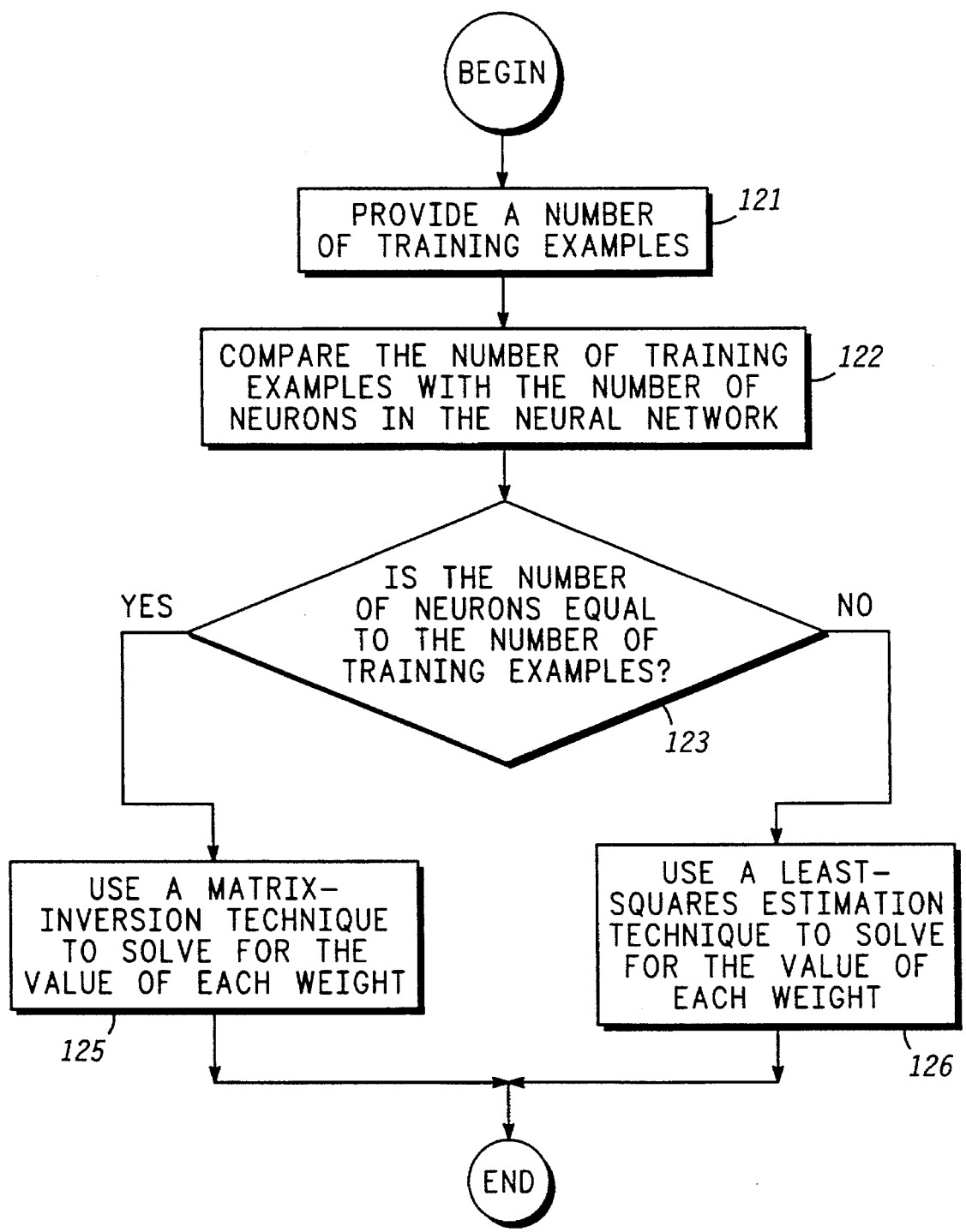
FIG. 11 shows a method of determining the weights of each neuron in accordance with a preferred embodiment of the invention.

For a preferred embodiment of the neural network of the present invention the training algorithm shown in FIG. 11 is used.

FIG. 11 shows a method of determining the weights of each neuron in accordance with a preferred embodiment of the invention. First, regarding box 121, a number of training examples are provided.

Next, regarding box 122, a comparison is made between the number of training examples provided and the number of neurons in the neural network.

Regarding decision box 123, if the number of neurons is equal to the number of training examples, the procedure goes to box 125, which indicates that a matrix-inversion technique may be employed to solve for the value of each weight.

Regarding decision box 123, if the number of neurons is not equal to the number of training examples, the procedure goes to box 126, which indicates that a least-squares estimation technique is employed to solve for the value of each weight. Suitable least-squares estimation techniques include, for example, least-squares, extended least-squares, pseudo-inverse, Kalman filter, maximum-likelihood algorithm, Bayesian estimation, and the like.

The use of the training algorithm will be illustrated in greater detail below regarding FIG. 12.

EXAMPLE

Figure 12:
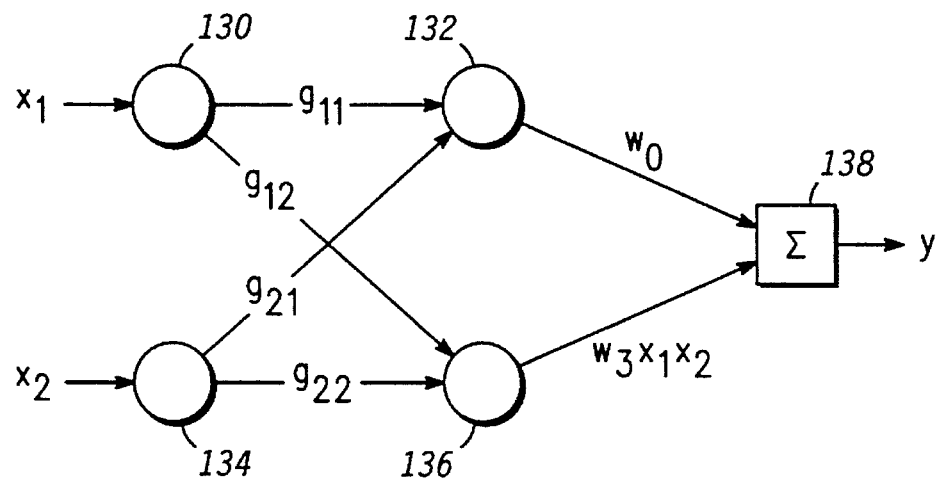
FIG. 12 shows a block diagram of a neural network of the present invention as applied to one system.

FIG. 12 shows a block diagram of the neural network of the present invention as applied to one system. In this system there are two inputs, $x_1$ and $x_2$, and one output y. The operation of the system is represented by the four examples expressed in Table 1. For instance, a first example is where $x_1=-1$, $x_2=-1$, and y=0.

TABLE 1

| x1 | x2 | y |
|----|----|----|
| −1 | −1 | 0 |
| −1 | 1 | −1 |
| 1 | −1 | −1 |
| 1 | 1 | 0 |

Referring to FIG. 12, a first input $x_1$ is fed to input node 130 of the input layer, while a second input $x_2$ is fed to input node 134. The output of each input node 130 and 134 in the input layer is distributed to each neuron circuit 132 and 136 of the hidden layer. That is, the output of input node 130 is coupled to neuron circuits 132 and 136, and the output of input node 134 is also coupled to neuron circuits 132 and 136.

As described in the above-identified Related Invention, the gated inputs are first produced by the respective neuron circuit. Next they are multiplied by the multiplier circuit of the neuron circuit to produce a product which is multiplied by a predetermined weight to produce the neuron circuit output. The outputs of neuron circuits 132 and 136 are summed by summing circuit 138 in the output layer to produce the output y of the neural network.

As described above, the neural network can be described by Equation 1, wherein the number of neuron circuits is defined by the number of training examples. Thus in this case four neuron circuits are defined as follows:

$$y=w_0+w_1x_1+w_2x_2+w_3x_1x_2 \qquad \text{Equation 4}$$

It is then straight-forward to solve the weights $w_0$, $w_1$, $w_2$, and $w_3$ by substituting the values of $x_1$, $x_2$, and y of each example into Equation 4 and solving the resulting equations as follows:

$$0=w_0+w_1(-1)+w_2(-1)+w_3(-1)(-1) \qquad \text{Equation 5}$$

$$-1=w_0+w_1(-1)+w_2(1)+w_3(-1)(1) \qquad \text{Equation 6}$$

$$-1=w_0+w_1(1)+w_2(-1)+w_3(1)(-1) \qquad \text{Equation 7}$$

$$0=w_0+w_1(1)+w_2(1)+w_3(1)(1) \qquad \text{Equation 8}$$

Solving the above Equations 5–8 produces $w_0=-0.5$, $w_1=0$, $w_2=0$, and $w_3=+0.5$. Substituting these values in Equation 4 yields:

$$y=-0.5+0.5\ (x_1x_2) \qquad \text{Equation 9}$$

The neural network for this system is shown in FIG. 12. For neuron 132 the gating function is $g_{11}=0$, $g_{21}=0$, and the weight $w_0=-0.5$, and for neuron 136 the gating function is $g_{12}=1$, $g_{22}=1$, and the weight $w_3=0.5$. The neuron 132 produces an output value of $w_0$, and neuron 136 produces an output value of $w_3\ x_1\ x_2$.

It will be appreciated that fewer neuron circuits may sometimes be used to perform the required calculations. This is shown by the above example, in which only two neuron circuits are needed instead of four, because two of the weights (i.e. $w_1$ and $w_2$) are equal to 0.

It will also be appreciated that this solution is derived without any repetitive training. The solution is also a global minimum and not a local minimum.

If the designer chooses to use fewer neurons than the given example, then the following least-squares technique may be employed as will now be shown. Using the same training examples given by Table 1 above, a neural network comprising only two neurons can be chosen to illustrate the concept as follows:

$$y=w_1\ x_1+w_2\ x_2 \qquad \text{Equation 10}$$

Equation 10 expresses the application of a two-neuron example. To solve for the values of $w_1$ and $w_2$, a set of equations can be obtained by substituting the values of $x_1$ and $x_2$ given by the training examples in Table 1 for $x_1$ and $x_2$ in Equation 10 as follows:

$$0=-w_1-w_2 \qquad \text{Equation 11}$$

$$-1=-w_1+w_2 \qquad \text{Equation 12}$$

$$-1=w_1-w_2 \qquad \text{Equation 13}$$

$$0=-w_1+w_2 \qquad \text{Equation 14}$$

From this it is relatively easy to compute $w_1$ and $w_2$, using a least-squares technique familiar to one of ordinary skill, yielding the following equation:

$$y=0.5x_1-0.5x_2 \qquad \text{Equation 15}$$

Verifying Equation 15 by substituting the values of $x_1$ and $x_2$ given by Table 1, we display the result in Table 2:

TABLE 2

| x1 | x2 | y |
|----|----|----|
| −1 | −1 | 0 |
| −1 | 1 | −1 |
| 1 | −1 | 1 |
| 1 | 1 | 0 |

It will be noted that the only difference between Table 1 and Table 2 is that in Table 2 for $x_1=1$ and $x_2=-1$, y=1 rather than y=−1. In general, the cost of using fewer neurons will result in less accuracy.

If the number of training examples is less than the number of neurons, then a pseudo-inverse technique, which is a type of least-squares solution, is used.

It should be noted by one of ordinary skill that the least-squares technique can be formulated for either batch or recursive solutions.

SUMMARY

Thus there has been described herein a concept, as well as several embodiments including a preferred embodiment, of a neural network which utilizes a plurality of neurons which do not individually incorporate any non-linear function or summing function and each of which requires only a multiplier as its main processing element.

Because the various embodiments of neural networks, and the methods of using and training same, as herein-described do not require repetitive training and provide a global minimum to each given set of input vectors, they perform with vastly more accurate results, at a vastly improved reduction in computational time, and with a vast reduction in the cost and complexity of implementation, whether on a semiconductor chip or in a computer program.

Furthermore, it will be apparent to those skilled in the art that the disclosed invention may be modified in numerous ways and may assume many embodiments other than the preferred form specifically set out and described above.

It will be understood that the concept of the present invention can vary in many ways. For example, it is a matter of design choice regarding such system structural elements as the number of input nodes, number of neurons or neuron circuits, and the number of summing means or circuits and their interconnection, depending upon the integrated circuit technology, type of implementation (e.g. analog, digital, software, etc.), die sizes, pin-outs, and so on.

It will also be apparent that the degree of truncation of the above-mentioned polynomial expansion depends upon the degree of accuracy desired.

Accordingly, it is intended by the appended claims to cover all modifications of the invention which fall within the true spirit and scope of the invention.

What is claimed is:

1. A neural network having a plurality of network inputs and at least one network output, said neural network comprising:

a plurality of input nodes, each input node coupled to a corresponding one of said plurality of network inputs and generating corresponding outputs;

a plurality of hidden neurons, each hidden neuron having a plurality of neuron inputs and generating an output based on the product of a plurality of functions, wherein each of said plurality of functions is proportional to one of said plurality of neuron inputs raised to the power of one of a plurality of constants;

means for distributing said output of each input node to one of said neuron inputs of at least one of said plurality of hidden neurons; and means for summing outputs of said hidden neurons and generating said at least one network output.

2. The neural network recited in claim 1 wherein each of said plurality of constants is an integer.

3. The neural network recited in claim 2 wherein said at least one network output is based on a weighted sum of the outputs of said hidden neurons.

4. A neural network having a plurality of network inputs and a plurality of network outputs, said neural network comprising:

an input node for receiving successive ones of said plurality of network inputs and generating corresponding node outputs;

a plurality of hidden neurons, each hidden neuron having at least one neuron input and generating a neuron output based on a product of a plurality of functions, each of said plurality of functions being a function of said at least one neuron input;

means for distributing said node outputs to said at least one neuron input of each of said plurality of hidden neurons; and means for summing neuron outputs and generating said plurality of network outputs, said means for summing including a plurality of summers each summing the outputs of predetermined ones of said hidden neurons and generating said network outputs.

5. The neural network recited in claim 4 wherein said hidden neurons comprise a linear transfer function.

6. The neural network recited in claim 4 wherein the outputs of at least some of said hidden neurons may be summed by more than one of said summers.

7. The neural network recited in claim 4 wherein said neural network is contained on at least one integrated circuit.

8. The neural network recited in claim 4 wherein said neural network is contained in a computer program.

9. The neural network recited in claim 4 wherein each of said plurality of functions is proportional to said at least one neuron input raised to the power of at least one constant.

* * * * *